_United States Patent Office_

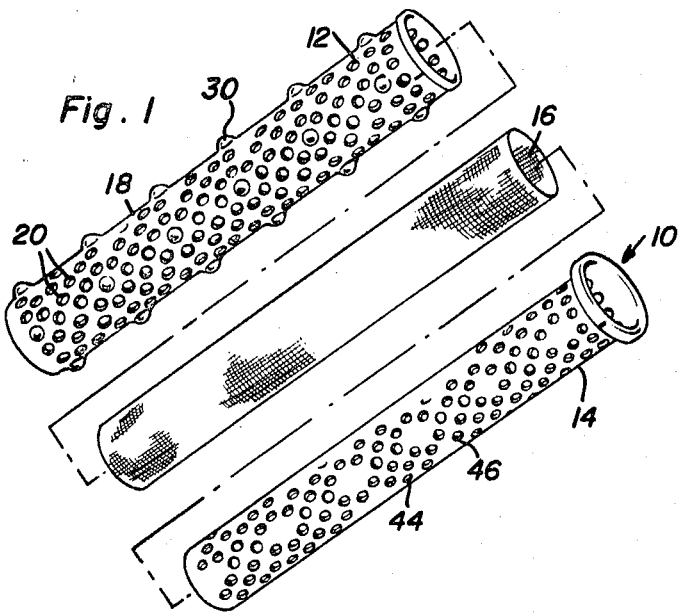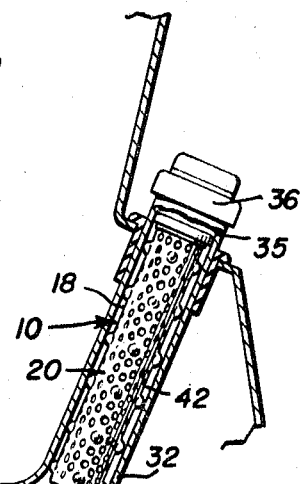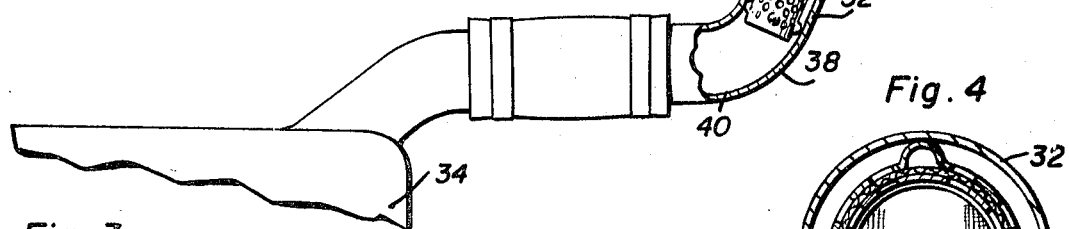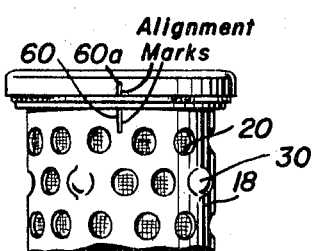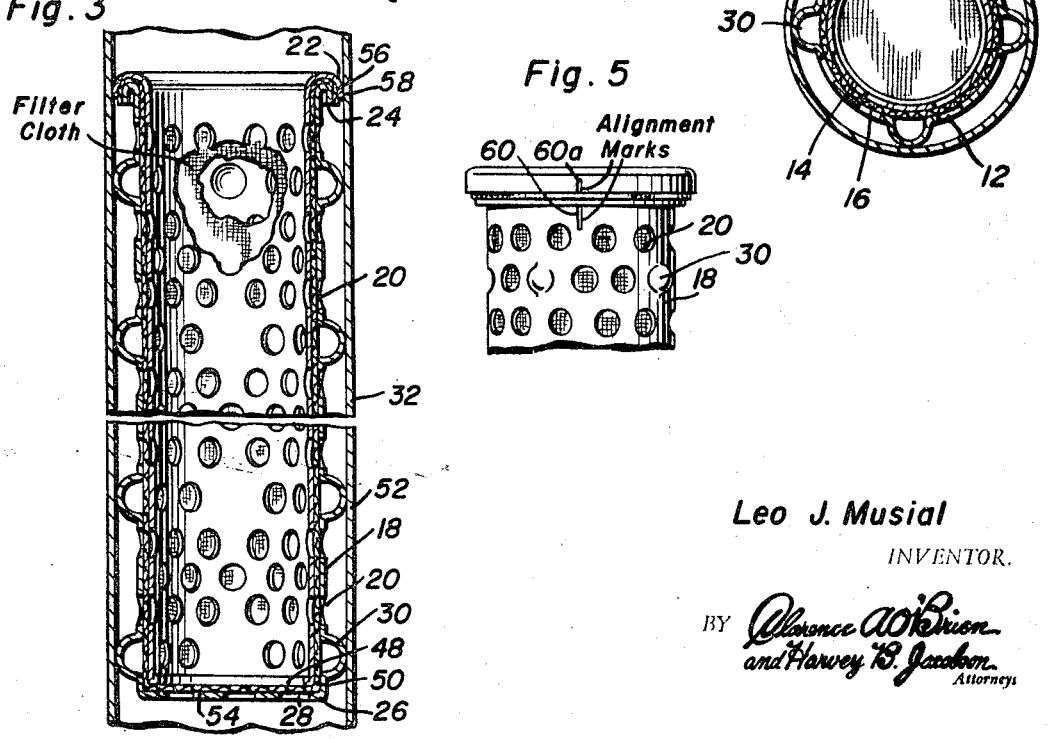
Leo J. Musial
INVENTOR.

3,456,799
Patented July 22, 1969

3,456,799
FILTER UNIT FOR VEHICLE GAS TANKS
Leo J. Musial, 31—46 69th St.,
Jackson Heights, N.Y. 11372
Filed June 22, 1966, Ser. No. 559,438
Int. Cl. B01d 27/04
U.S. Cl. 210—91                                1 Claim

ABSTRACT OF THE DISCLOSURE

A cylindrical filtering unit to be disposed axially within the filler pipe for the gas tank of an internal combustion engine and spaced radially therewithin to pass all of the fuel to be deposited in the tank through the filter to remove impurities therefrom.

---

This invention generally appertains to filtering devices for use in filling tanks or receptacles with liquids and more particularly relates to novel improvements in filter or strainer units particularly adapted for use in association with gasoline tanks for vehicular carried internal combustion engines or stationary engines.

The advantage of a final filtering of gasoline as it is introduced into the gas tank of a motor vehicle at a gasoline station has been recognized as being very important. For this reason, many modern gasoline stations have equipped the pumping hoses with filtering means so that the gasoline is filtered prior to its introduction into the gas tank of a vehicle. However, not all of the modern gasoline pumping stations have such filtering equipment for a final filtering of the gasoline before it is introduced into the gas tank of the vehicle.

Accordingly, it is an important object of the present invention to provide a very simple, compact and efficient filter, which can be easily mounted in the filler pipe of a gas tank of a vehicle, whereby the gasoline pumped into the tank will be filtered, regardless of what gasoline or service station is used, so that impurities are filtered out from the gasoline to protect the carburetor, fuel lines and fuel pump from impurities or foreign matter.

Another important object of the present invention is to provide a filter assembly, which can be easily installed in and removed from the filler pipe of a gas tank for a vehicle and which consists of relatively few components and which is constructed and adapted to be mounted in the filler pipe in a manner so that it functions efficiently to filter the gasoline and yet does not impede or interfere with the flow of the gasoline into the gas tank from the service station gas pump.

Another important object of the present invention is to provide an extremely simple and inexpensive filter assembly which will find its most important environment in association with the gas tank of a motor vehicle but which can be effectively used in association with the filling of other tanks, such as storage tanks for gasoline and the like liquids, or, more especially, with stationary engines, irrespective of the type thereof.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is an exploded perspective view of the filter unit of the present invention;

FIGURE 2 is a side elevational view thereof showing the same mounted in position in a filler pipe of a gas tank or a vehicle (not shown);

FIGURE 3 is a longitudinal sectional view;

FIGURE 4 is a transverse, cross-sectional view; and

FIGURE 5 is an enlarged elevational view of the upper end of the filter unit, shown in assembled relationship.

Referring now more particularly to the accompanying drawing, the filter unit 10 is composed of three components, namely, an outer tubular member or shell 12 and an inner tubular member or shell 14, between which a tubular filter element 16 is adapted to be secured.

The outer tubular element or shell 12 is preferably formed of a sturdy but inexpensive material, such as plastic, which is long lasting and is not effected in any way by gasoline, kerosene or any similar type of flammable fuel liquid. The outer tubular element 12 has a cylindrical side wall 18, which is formed with a plurality of apertures 20 and has an open upper end 22, the latter being formed with an outstanding hook-line flange 24. The outer tubular member or shell 12 has a bottom wall 26 which is formed with apertures 28.

The tubular member 12 is formed with hemispherical protrusions or dimples 30, which are provided for the purpose of spacing the same radially inwardly from the inner surface or wall of a filler pipe 32 for a conventional gas tank 34 of a motor vehicle (not shown). As is conventional, the filler pipe 32 extends from its upper end 35, which is accessible exteriorly of the body of the motor vehicle (not shown) and is provided with a filler closure or cap 36, to a lower end 38 which is connected by an integral elbow 40 with a lateral prolongation that is in direct communication with the gas tank 34.

The filter 10 is of a length so that it fits within the filler pipe 32 and is accessible from the open end 35 thereof but is prevented from moving downwardly or inwardly to a position, where it cannot be easily grasped and removed, by virtue of the elbow 38. Thus, the tubular outer member 12 is elongated and is of a length substantially equal to the length of the filler tube 32 and is positioned axially therein and is spaced by the protrusions or dimples 30 from the inner wall of the filler pipe, whereby a radial open zone or space 42 is provided between the filter unit 10 and the filler pipe for the free flow of gasoline, after it has passed through the filter 10, whereby the filter will not impede the normal flow of gasoline into the gas tank 34 from the gas pump of a service station.

The filter 10 further includes the inner tubular member or shell 14, which is of a slightly smaller diameter than the outer member 12 and is adapted to fit therein. The inner tubular member or shell 14 has a cylindrical side wall 44, which is formed with apertures 46 and an open lower end 48, which is turned back upon itself to provide a reinforced lower edge 50. The inner shell 14 is of substantially the same length as the outer member or shell 12.

The filter element 16 is disposable and is tubular and has a cylindrical side wall 52 and a flat bottom wall 54 and an open upper end. The filter element 16 is formed from cheesecloth or the like fibrous material and is adapted to be inserted between the inner and outer tubular elements and held securely therein by having its upper edge 56 anchored between the outwardly and downwardly turned hook-like flange edge 24 on the outer tubular element and a similar cooperating flange 58 formed on the upper end of the inner tubular member 14.

As can be appreciated from a consideration of FIGURE 3, the tubular members have their cylindrical side walls of such a diameter that the inner member 14 fits snugly within the outer tubular member or shell 12 with the filter element 16 securely held in place in an interposed position between the inner and outer concentrically arranged members or shells 12 and 14. The reinforced bottom edge 50 of the inner shell holds the bottom wall 54 of the filter element 16 tightly against the apertured bottom wall 26 of the outer shell and the side walls of the inner and outer members or shells 12 and 14 cooperate to hold the filter element 16 therebetween, with the filter element being securely held in place by the cooperating hook-like flanges on the upper edges of the inner and outer elements and by the lower edge 50 of the inner member 14.

As shown in FIGURE 5, the outer shell and inner shell are formed with alignment marks 60 and 60a, the mark 60 being formed vertically on the outer shell, just below the flanged upper edge and the alignment mark 60a being formed vertically on the outer surface of the flange of the inner shell. When the alignment marks 60 and 60a are in axial coincidence, as shown in FIGURE 5, this ensures that the apertures in the inner and outer shells are in alignment, whereby the gasoline being pumped into the filler pipe 32 can easily pass through the aligned apertures, the gasoline being filtered by virtue of the inner filter element 16 as it passes through the registering or aligned apertures in the inner and outer tubular elements or shells.

The filter element 16 is disposable and, after the filter 10 has been in use for a certain period, the filter can be lifted out from the filler pipe 32 and the inner and outer shells separated so as to remove the dirty filter element 16 and replace it with a new one, which is of identical form and construction.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A filter unit adapted for insertion in a filler pipe having an inner elbow, the unit comprising a foraminous inner tubular member including an upper end flared outwardly, a foraminous outer tubular member having an upper end flared outwardly, the inner and outer tubular members being disposed in concentric spaced juxtaposition with the flared ends of the respective members being retained in peripheral spaced relation, the respective opposite ends of the tubular members being in substantial transverse alignment, a tubular filter element positioned between the inner and outer tubular members, the element having an upper end clamped between the flared ends of the inner and outer tubular members, the outer tubular member having knob-like protrusions extending outwardly around the circumference and along the length thereof to miantain the apertured side wall of the outer shell in radial spaced relation from the filler pipe for permitting fuel to pass therethrough, the protrusion adjacent the lower end of the outer tubular member being adapted to engage the elbow of the filler pipe thereby limiting inward travel of the filter unit, and cooperating indicating means formed on the tubular members to permit radial registry to the apertures therein thereby producing an efficient flow path through the filter unit.

References Cited

UNITED STATES PATENTS

| 856,361 | 6/1907 | Neiburg | 210—497 X |
|---|---|---|---|
| 1,855,904 | 4/1932 | Brown et al. | 210—477 X |
| 2,010,445 | 8/1935 | Sparks | 220—86 |
| 2,147,792 | 2/1939 | Knight | 210—445 X |
| 3,198,865 | 8/1965 | Porter et al. | 210—497 X |
| 2,237,499 | 4/1941 | Osterdahl | 55—381 X |
| 2,524,313 | 10/1950 | Gerling | 210—86 X |
| 3,080,977 | 3/1963 | Jones | 55—387 X |

FOREIGN PATENTS 844,108   5/1958   Great Britain.

REUBEN FRIEDMAN, Primary Examiner

T. A. GRANGER, Assistant Examiner

U.S. Cl. X.R.

210—437, 448